US012182511B2

(12) United States Patent
Dimitriadis et al.

(10) Patent No.: US 12,182,511 B2
(45) Date of Patent: Dec. 31, 2024

(54) PERSONALIZED NATURAL LANGUAGE PROCESSING SYSTEM

(71) Applicant: Microsoft Technology Licensing, LLC, Redmond, WA (US)

(72) Inventors: Dimitrios Basile Dimitriadis, Bellevue, WA (US); Vaishnavi Shrivastava, Seattle, WA (US); Milad Shokouhi, Seattle, WA (US); Robert Alexander Sim, Bellevue, WA (US); Fatemehsadat Mireshghallah, San Diego, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 335 days.

(21) Appl. No.: 17/655,151

(22) Filed: Mar. 16, 2022

(65) Prior Publication Data

US 2023/0297777 A1    Sep. 21, 2023

(51) Int. Cl.
*G06F 40/284* (2020.01)
*G06F 40/30* (2020.01)

(52) U.S. Cl.
CPC ............ *G06F 40/284* (2020.01); *G06F 40/30* (2020.01)

(58) Field of Classification Search
CPC ....... G06F 40/284; G06F 40/30; G06F 40/216
See application file for complete search history.

(56) References Cited

U.S. PATENT DOCUMENTS

| 2011/0125852 A1* | 5/2011 | Wolfe | H04L 12/1827 709/206 |
| 2022/0172063 A1* | 6/2022 | Decrop | G06N 3/084 |
| 2022/0210021 A1* | 6/2022 | Sinkar | H04L 43/0876 |
| 2023/0123328 A1* | 4/2023 | Gorman | G06F 40/289 715/256 |

(Continued)

OTHER PUBLICATIONS

Li et al. ((2019). Towards Personalized Review Summarization via User-Aware Sequence Network. Proceedings of the AAAI Conference on Artificial Intelligence, 33(01), 6690-6697. https://doi.org/10.1609/aaai.v33i01.33016690) (Year: 2019).*

(Continued)

*Primary Examiner* — Pierre Louis Desir
*Assistant Examiner* — Keisha Y. Castillo-Torres
(74) *Attorney, Agent, or Firm* — Alleman Hall & Tuttle LLP

(57) ABSTRACT

A personalized natural language processing system tokenizes a plurality of sets of raw text data to generate a plurality of sets of tokenized text data for the plurality of users, respectively. The tokenized text data includes a sequence of tokens corresponding to the raw text data, the tokens at least identifying distinct words or portions of words in the raw text. The system appends predetermined user-specific tokens to the sets of tokenized text data from the users, respectively. Each predetermined user-specific token corresponds to one of the users. The system processes the sets of tokenized text data using the NLP model in accordance with the appended predetermined user-specific tokens to predict a personalized classification for the sets of tokenized text data from each of (Continued)

the users, and outputs the personalized classifications of the tokenized text data for each of the users.

18 Claims, 11 Drawing Sheets

(56) References Cited

U.S. PATENT DOCUMENTS

| | | | | |
|---|---|---|---|---|
| 2023/0146336 A1* | 5/2023 | Wang | ................. | G06N 3/045 |
| | | | | 705/26.1 |
| 2023/0222358 A1* | 7/2023 | Wu | ................. | G06N 5/022 |
| | | | | 706/61 |

OTHER PUBLICATIONS

Zhong et al. ("UserAdapter: Few-shot user learning in sentiment analysis." Findings of the Association for Computational Linguistics : ACL-IJCNLP 2021. 2021. https://aclanthology.org/2021.findings-acl.129.pdf) (Year: 2021).*

Caldas, et al., "Leaf: A Benchmark for Federated Settings", In Repository of arXiv:1812.01097v1, Dec. 3, 2018, 6 Pages.

Deng, et al., "Adaptive Personalized Federated Learning", In Repository of arXiv:2003.13461v3, Nov. 6, 2020, 50 Pages.

Devlin, et al., "BERT: Pre-training of Deep Bidirectional Transformers for Language Understanding", In Repository of arXiv:1810.04805v1, Oct. 11, 2018, 14 Pages.

Diao, et al., "Jointly Modeling Aspects, Ratings and Sentiments for Movie Recommendation (JMARS)", In Proceedings of the 20th ACM SIGKDD International Conference on Knowledge Discovery and Data Mining, Aug. 24, 2014, pp. 193-202.

Flek, Lucie, "Returning the N to NLP: Towards Contextually Personalized Classification Models", In Proceedings of the 58th Annual Meeting of the Association for Computational Linguistics, Jul. 5, 2020, pp. 7828-7838.

Go, et al., "Twitter Sentiment Classification using Distant Supervision", In CS224N Project Report, Stanford vol. 1, Issue 12, Dec. 2009, 6 Pages.

He, et al., "A Probabilistic Formulation of Unsupervised Text Style Transfer", In Proceedings of the 8th International Conference on Learning Representations, Apr. 26, 2020, 14 Pages.

King, et al., "Evaluating Approaches to Personalizing Language Models", In Proceedings of the 12th Language Resources and Evaluation Conference, May 11, 2020, pp. 2461-2469.

Kulkarni, et al., "Survey of Personalization Techniques for Federated Learning", In Proceedings of the 4th World Conference on Smart Trends in Systems, Security and Sustainability, Jul. 27, 2020, pp. 794-797.

Lee, et al., "Meta Learning and Its Applications to Natural Language Processing", In Proceedings of the 59th Annual Meeting of the Association for Computational Linguistics and the 11th International Joint Conference on Natural Language Processing, Aug. 1, 2021, pp. 15-20.

Li, et al., "Fair Resource Allocation in Federated Learning", In Proceedings of the 8th International Conference on Learning Representations, Apr. 26, 2020, 27 Pages.

Li, et al., "Prefix-Tuning: Optimizing Continuous Prompts for Generation", In Proceedings of the 59th Annual Meeting of the Association for Computational Linguistics and the 11th International Joint Conference on Natural Language Processing, Aug. 1, 2021, pp. 4582-4597.

Mansour, et al., "Three Approaches for Personalization with Applications to Federated Learning", In Repository of arXiv:2002.10619v1, Feb. 25, 2020, 23 Pages.

Mazaré, et al., "Training Millions of Personalized Dialogue Agents", In Proceedings of the Conference on Empirical Methods in Natural Language Processing, Oct. 31, 2018, pp. 2775-2779.

Konecny, et al., "Federated Learning: Strategies for Improving Communication Efficiency", In Repository of arXiv:1610.05492v2, Oct. 30, 2017, 10 Pages.

Mireshghallah, et al., "Privacy in Deep Learning: A Survey", In Repository of arXiv:2004.12254v1, Apr. 25, 2020, 18 Pages.

Mireshghallah, et al., "UserIdentifier: Implicit User Representations for Simple and Effective Personalized Sentiment Analysis", In Repository of: arXiv:2110.00135v1, Oct. 1, 2021, 6 Pages.

Schneider, et al., "Mass Personalization of Deep Learning", In Repository of arXiv:1909.02803v1, Sep. 6, 2019, 9 Pages.

Tang, et al., "Document Modeling with Gated Recurrent Neural Network for Sentiment Classification", In Proceedings of the Conference on Empirical Methods in Natural Language Processing, Sep. 17, 2015, pp. 1422-1432.

Wang, et al., "A Field Guide to Federated Optimization", In Repository of arXiv:2107.06917v1, Jul. 14, 2021, 88 Pages.

Wang, et al., "Personalized Microblog Sentiment Classification via Adversarial Cross-Lingual Multi-Task Learning", In Proceedings of the Conference on Empirical Methods in Natural Language Processing, Oct. 31, 2018, pp. 338-348.

Yang, et al., "Overcoming Language Variation in Sentiment Analysis with Social Attention", In Journal of Transactions of the Association for Computational Linguistics, vol. 5, Aug. 2017, pp. 295-307.

Zhong, et al., "UserAdapter: Few-Shot User Learning in Sentiment Analysis", In Proceedings of Findings of the Association for Computational Linguistics, Aug. 1, 2021, pp. 1484-1488.

Li, et al., "A Persona-Based Neural Conversation Model", In Repository of arXiv:1603.06155v2, Jun. 8, 2016, 10 Pages.

* cited by examiner

| Dataset | # Users | # Samples | # Classes |
|---|---|---|---|
| IMDB | 1,012 | 137,710 | 10 |
| Yelp | 4,460 | 428,369 | 5 |
| Sent140 | 1,100 | 56,557 | 2 |
| Sent140 (skewed) | 473 | 23,155 | 2 |

FIG. 7

| | Dataset | Conventional | UserAdapter | Trainable UserEmb. | | | UserIdentifier | | |
|---|---|---|---|---|---|---|---|---|---|
| | | | | Num. | Def. | Rand. All | Num. | Def. | Rand. All |
| RoBERTa | IMDB | 45.1 | 46.2 | 45.5 | – | 48.9 | 50.1 | – | 52.5 |
| | Yelp | 68.3 | 70.2 | 68.3 | – | 70.6 | 69.5 | – | 71.3 |
| BERT | Sent140 | 84.7 | – | 84.7 | 86.3 | 86.5 | 84.9 | 87.1 | 87.1 |
| | Sent140 (Skewed) | 86.3 | – | 87.2 | 89.3 | 90.0 | 87.5 | 90.3 | 90.4 |

FIG. 8

|  | Seq. Len. | Rand. Dig | Rand. Non. | Rand. All |
|---|---|---|---|---|
| IMDB | 5 | 48.8 | 51.3 | 52.2 |
| | 10 | 47.4 | 51.7 | 52.5 |
| | 20 | 47.1 | 50.2 | 51.1 |
| | 50 | 46.5 | 48.7 | 50.8 |
| | 200 | 33.3 | 32.8 | 40.1 |
| Yelp | 5 | 68.6 | 69.3 | 70.8 |
| | 10 | 68.7 | 69.6 | 71.3 |
| | 20 | 68.4 | 68.6 | 71.0 |
| | 50 | 67.8 | 69.0 | 70.6 |
| | 200 | 63.2 | 60.2 | 65.1 |

FIG. 9

PERSONALIZED NATURAL LANGUAGE PROCESSING SYSTEM

BACKGROUND

Global natural language processing (NLP) models are typically trained to be as generalizable as possible, with user invariance considered desirable since the models are shared across multitudes of users. Personalization arises in applications where different clients use models specifically customized to their environment and client profiles. Technical challenges exist in the development of personalized natural language processing models, inhibiting their widespread adoption, as discussed below.

SUMMARY

To address the issues discussed above, a personalized natural language processing system is provided. The system comprises at least one processor, communicatively coupled to non-volatile memory storing a natural language processing (NLP) model personalized for use by multiple users and instructions that, when executed by the processor, cause the processor to receive or retrieve a plurality of sets of raw text data from a plurality of users, respectively; tokenize the plurality of sets of raw text data to generate a plurality of sets of tokenized text data for the plurality of users, respectively, the tokenized text data including a sequence of tokens corresponding to the raw text data, the tokens at least identifying distinct words or portions of words in the raw text; append predetermined user-specific tokens to the plurality of sets of tokenized text data from the plurality of users, respectively, each predetermined user-specific token corresponding to one of the plurality of users; process the plurality of sets of tokenized text data using the NLP model in accordance with the appended predetermined user-specific tokens to predict a personalized classification for the plurality of sets of tokenized text data from each of the plurality of users; and output the personalized classifications of the plurality of sets of tokenized text data for each of the plurality of users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a table summarizing datasets used to demonstrate the effectiveness of the system of FIG. 1.

FIG. 8 is a table comparing the accuracy of the system of FIG. 1 to a conventional system using a two-phase personalization method.

FIG. 9 is a table showing statistics from an ablation study into the sequence length and type of the user identifier sequence and the corresponding performance of the system of FIG. 1.

DETAILED DESCRIPTION

As discussed above, technical challenges exist in the development of personalized natural language processing (NLP) models. To illustrate, a next-word-prediction task applied on the sentence "I live in . . . ", requires prediction of a different answer, customized for each user. As another example, a sentiment analysis task applied to the sentence "That is just great!" could carry a positive sentiment, a neutral sentiment, or even a negative sentiment depending on the user who uttered the sentence. In this example, even if a general model were trained on training data with sentences such as these labeled with different ground truth sentiments from different users, the model would not be able to correctly predict sentiment labels for the different users, due to the inherent heterogeneity existing in the sentence and ground truth labels of the training data. Further, if a general next word prediction or sequence-to-sequence model were trained in a similar manner, the model would not be able to correctly predict differences in the next word or next sequence of words that any one particular user would enter, given an input sequence of words.

Most techniques for personalization broadly involve two phases: first, a global model is built among all users, and then, the global model is personalized for each user using each user's data. In such cases, each user has either an entirely separate model or additional personal parameters, causing significant overheads, both in terms of storage of the large models and the computational complexity of training separate models for each user. As such, these models are often unable to produce personalized responses for individual users based on their data. Particularly at the scale of hundreds, thousands, or millions of users, the computational complexity and training and storage cost of these approaches makes them impractical.

Figure 1:
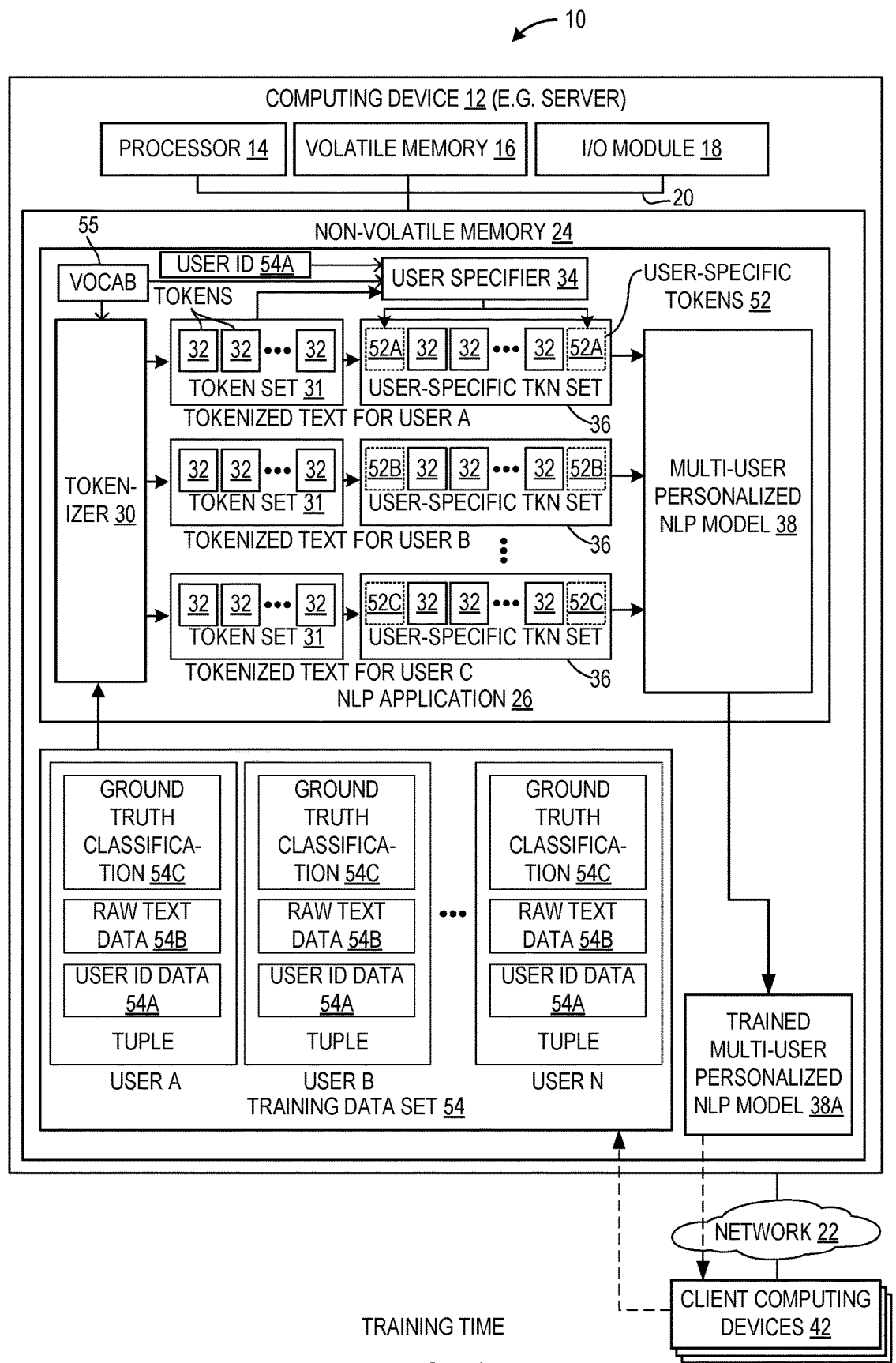
FIG. 1 is a general schematic diagram illustrating a personalized natural language processing system according to an example embodiment of the subject disclosure, at training time.

In view of the above issues, systems and methods are disclosed herein that enable personalized natural language processing with the potential benefit of reduced training and storage costs. Referring to FIG. 1, a personalized NLP system 10 is provided for use in outputting personalized classifications of tokenized text data. The personalized NLP system 10 comprises a computing device 12 including a processor 14, volatile memory 16, an input/output module 18, and non-volatile memory 24 storing a NLP application 26 including a tokenizer 30, a user specifier 34, and a multi-user personalized NLP model 38. Computing device 12 may be, for example, a server housed in a data center. Alternatively, computing device 12 may be another type of computing device such as a laptop or desktop device. A bus 20 operatively couples the processor 14, the input/output module 18, and the volatile memory 16 to the non-volatile memory 24. The input/output module 18 is configured to facilitate network communications over the network 22, graphical output to displays, and receipt of inputs from user input devices, for example.

Although the NLP application 26, tokenizer 30, user specifier 34, and personalized NLP model 38 are depicted as hosted (i.e., executed) at one computing device 12, it will be appreciated that the tokenizer 30, the user specifier 34, and the personalized NLP model 38 can alternatively be hosted across a plurality of computing devices to which the computing device 12 is communicatively coupled via a network 22. As one example of one such other computing device, a client computing device 42 may be provided, which is operatively coupled to the computing device 12. In some examples, the network 22 may take the form of a local area network (LAN), wide area network (WAN), wired network, wireless network, personal area network, or a combination thereof, and can include the Internet.

Non-volatile memory 24 is memory that retains instructions stored data even in the absence of externally applied power, such as FLASH memory, a hard disk, read only memory (ROM), electrically erasable programmable memory (EEPROM), etc. The instructions include one or more programs such as NLP application 26, tokenizer 30, user specifier 34, and personalized NLP model 38, and data used by such programs sufficient to perform the operations described herein. In response to execution by the processor 14, the instructions cause the processor 14 to execute the NLP application 26, including tokenizer 30, user specifier 34, and personalized NLP model 38 to perform training and inference as described herein.

The processor 14 is a microprocessor that includes one or more of a central processing unit (CPU), a graphical processing unit (GPU), an application specific integrated circuit (ASIC), a system on chip (SOC), a field-programmable gate array (FPGA), a logic circuit, or other suitable type of microprocessor configured to perform the functions recited herein. The system 10 further includes volatile memory 16 such as random access memory (RAM), static random access memory (SRAM), dynamic random access memory (DRAM), etc., which temporarily stores data only for so long as power is applied during execution of programs.

Turning now to the operation of personalized NLP system 10 during training time as illustrated in FIG. 1, a training data set 54 is stored in non-volatile memory. The training data set 54 is generated by gathering data from multiple users using multiple client computing devices 42. The data may be gathered from public sources such as social media posts, online reviews, and blogs, or private sources such as documents, emails, and instant messages upon receiving appropriate opt-in permission from each user to participate in the training. The training data set 54 includes multiple tuples of training data, each tuple including user identifier data 54A identifying a particular user, raw text data 54B from that particular user, and ground truth classification data 54C. The user identifier data 54A can be configured so as to not include any personally identifying information. The raw text data 54B may be utterances (i.e., recognized speech from an audio source), social media posts, electronic messages such as emails, chat messages, or text messages, or other type of text for which classification is desired, for example. The ground truth classification 54C may be, for example, a sentiment classification, or may be, for example, a prediction of a next word in a sequence, or a prediction of an output sequence, as described in more detail below. Three tuples are depicted for each of three different users: USER A, USER B, and USER N. Although three tuples are depicted, it will be understood that in practice, tens, hundreds, or thousands of such tuples may be included for each user, and training data for tens, hundreds, or thousands of users may be used to train one model.

The raw text data 54B is tokenized by tokenizer 30 to produce a set of tokenized text data 31, which includes a sequence of tokens 32. Any of a variety of tokenizers may be used, as appropriate, and specific examples are given below. User specifier 34 is a software module that receives the user identification data 54A, determines user-specific tokens 52A for each user based on the user identification data 54A, and inserts the user-specific tokens 52A into the token set, for example at the start and end of each sentence, to thereby demarcate the utterance within a user-specific token set 36. Thus, as depicted, the user-specific token set 36 includes both user-specific tokens 52A inserted by the user specifier 34, and the tokens 32 representing the words in the user utterance contained in the raw text data 54B. Tokenized text for User A, User B, and User N are depicted, and the user-specific token set 36 for each contains user-specific tokens 52A, 52B, and 52C associated with each. It will be appreciated that user-specific tokens 52 are typically determined by the user specifier 34 using tokens in the vocabulary 55 of the tokenizer 30. The user-specific tokens 52 may be one token, or a combination of tokens selected from the vocabulary. The number of tokens used for the combination is determined such that it is sufficient to provide unique combinations of tokens for each user in the set of users using the trained multi-user NLP model 38A. The user-specific token sets 36 are inputted into the multi-user personalized NLP model 38 during training, along with the corresponding ground truth classifications 54C, the model is trained based on the training data set 54, and a trained multi-user NLP model 38A is outputted. The trained multi-user personalized NLP model 38A may be deployed on computing device 12, on client computing devices 42, or on another computing device at run-time, i.e., during inference.

Figure 2:
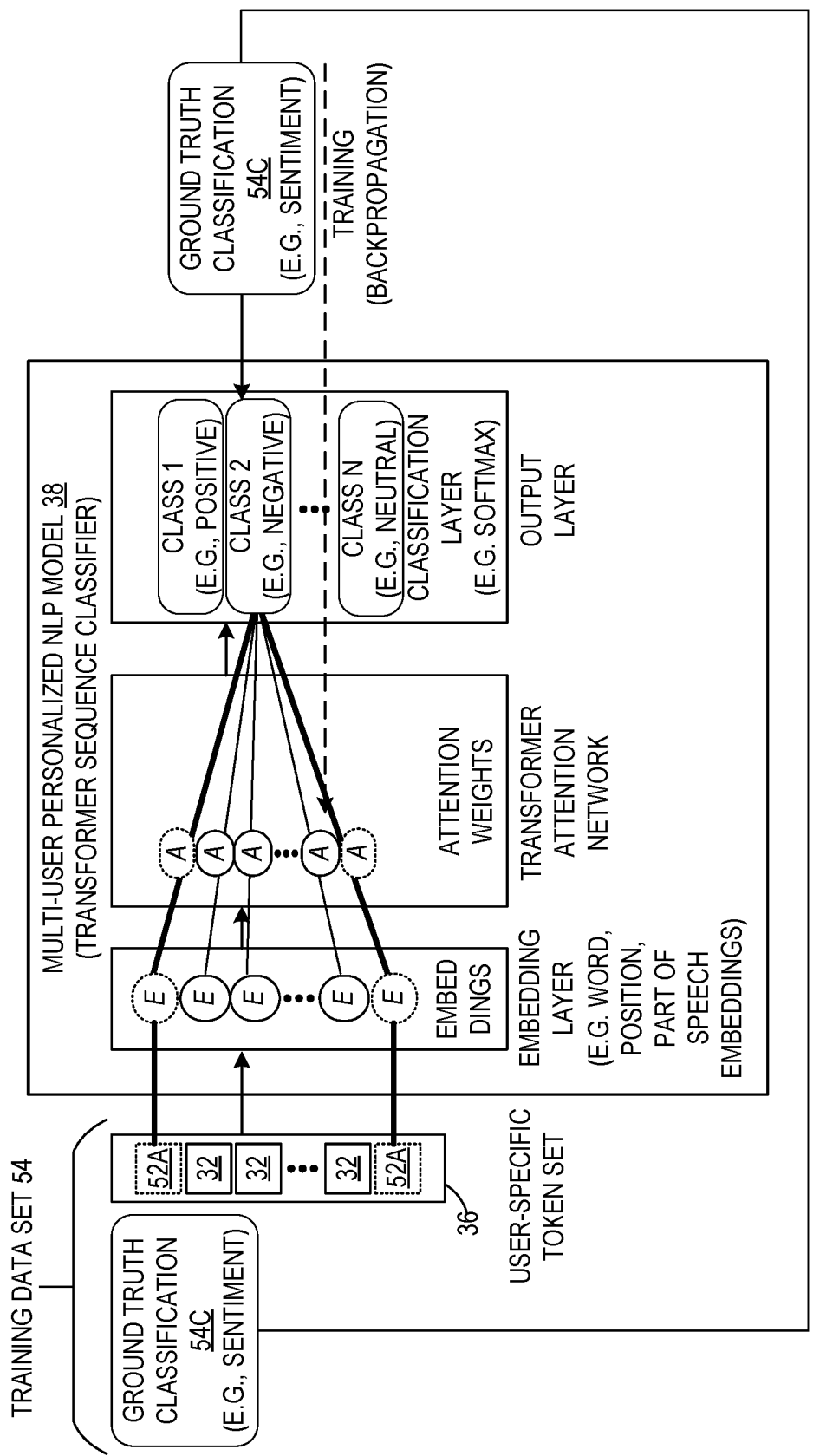
FIG. 2 is a schematic diagram illustrating details of training a multi-user personalized natural language processing model of the system of FIG. 1, configured as a transformer sequence classifier.

Now, examples of the different model architectures and training methods for NLP model 38 will now be described. Turning initially to FIG. 2, multi-user personalized model 38 is shown configured as a transformer sequence classifier. One example of a sequence classifier is a sentiment analysis classifier that is configured to receive a sequence of words and classify the words as being associated with a particular human sentiment, as briefly described above. To train the transformer sequence classifier, pairs of ground truth sentiment and word sequences are input to the model 38. The depicted transformer sequence classifier uses an embedding layer to compute embeddings E based upon the input vector, i.e., the user-specific token set 36. For example, word position and part of speech embeddings may be computed for each word token in the user-specific token set 36. A transformer attention network is provided to compute attention weights for each of the embeddings. The transformer attention network computes the value of attention from each embedding to each other embedding in the input vector. A classification layer such as a SoftMax layer is provided as an output layer for the NLP model 38. As depicted, the SoftMax layer includes a plurality of classifications, such as Class 1 (E.g., Positive), Class 2 (E.g., Negative), and Class N (E.g., Neutral). The final layer of the transformer attention network is fully connected to the classification layer. In the depicted example, bold lines schematically depict how user-specific tokens 52A in the user-specific token set are processed to be represented by embeddings, and the attention weights linking those embeddings to the ground truth classification (Negative) traverse the transformer attention network. It will be appreciated that for identical phrases with different sentiments indicated for different users, the words in the phrase will not distinguish the ground truth class, and thus the transformer attention network will learn to pay attention to the embeddings for the user-specific tokens.

In one example, the transformer uses scaled dot-product attention units to compute attention weights. When embeddings E for tokens in the training data set 54 are passed into the scaled dot-product attention units A, attention weights are calculated between the embeddings for every token simultaneously. Each attention unit A produces embeddings for every token in context that contain information about the token itself along with a weighted combination of other relevant tokens each weighted by its attention weight. The attention calculation for all the tokens can be expressed as one large matrix calculation using a SoftMax function, or a normalized exponential function. It will be noted that, when trained in this manner the personalized NLP model 38 can perform sentiment analysis or other personalized text classification or text prediction tasks for multiple users. The insertion of user-specific tokens during preprocessing of the tokenized text in training allows the training to generate a personalized NLP model 38 that can effectively perform personalized classification for multiple users without the need to train a separate NLP model for each different user.

During the training stage of the personalized NLP model 38 configured as a transformer sequence classifier as shown in FIG. 2, cross-entropy loss for classification can be minimized according to the following equations.

$$\mathcal{L}_{CE}(x, u_{id}, y; \theta) = -\log Pr(y \mid [u_{id}; x]; \theta) \quad (1)$$

$$\theta = \underset{\theta}{\mathrm{argmin}}\ \mathcal{L}_{CE}(x, u, y; \theta) \quad (2)$$

Here, x denotes the input set of tokenized text data (i.e., the user-specific token sets 36), $u_{id}$ denotes the user identifier for the user to whom the set of tokenized text data belongs, and y is the class label for x. For parametrizations of the user identifiers 52, parameter tying may be used, where the user identifiers 52 use the same set of parameters for their embeddings as the rest of the tokens. In other words, user embedding parameters of the predetermined user-specific tokens 52 may be tied to embedding parameters of the transformer classification model 38. These principles may be applied to the transformer sequence-to-sequence model of FIG. 3 as well.

Figure 3:
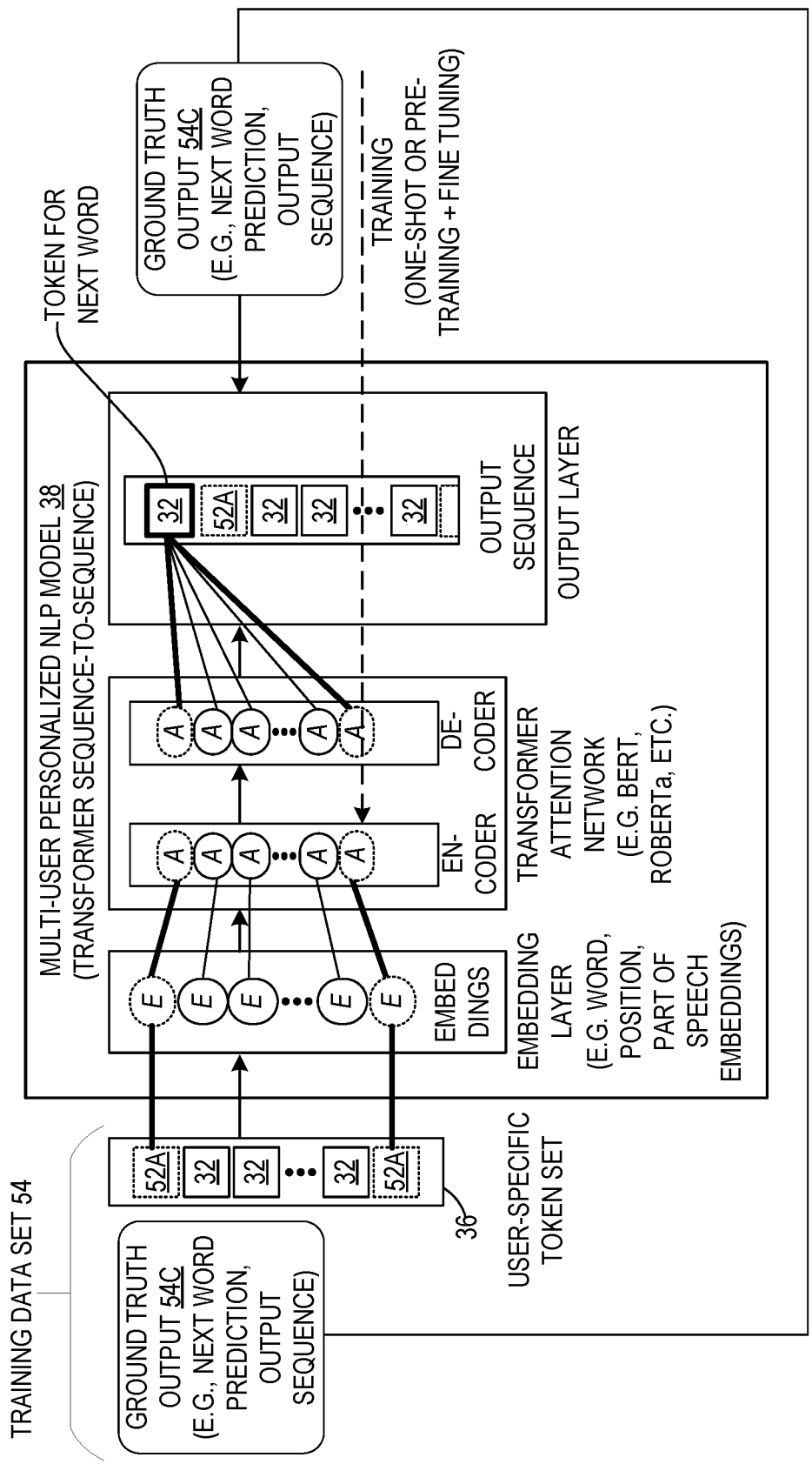
FIG. 3 is a schematic diagram illustrating details of training the multi-user personalized natural language processing model of the system of FIG. 1, configured as a transformer sequence-to-sequence classifier.

FIG. 3 illustrates a configuration in which the multi-user personalized NLP model 38 is configured as a transformer sequence-to-sequence model. This configuration can take as input a sequence of tokens in the user-specific token set 36 and output a next word or sequence based thereon. A variety of architectures may be used for the transformer model, including BERT, RoBERTa, XL-NET, ERNIE, etc. This configuration of personalized NLP model 38 may be trained in two phases: pre-training to learn embeddings E, and fine tuning, or in so-called one-shot training. During training, embeddings are learned for the word tokens in the input vectors contained within the training data set 54. The transformer attention network includes both an encoder to compute attention weights for the embeddings associated with the input, and also a decoder to transform the computed attention weights into an output sequence, such as a token for a next word or an output sequence. Thus, such a model may be configured to automatically predict the next few words a user is writing in a document, message, etc. The bold lines in FIG. 3 schematically illustrate how user-specific tokens are mapped to embeddings, and in turn to attention weights in each of the encoder and decoder, and finally to the token for a next word in the output sequence selected by the output layer of the personalized NLP model 38. A transformer sequence-to-sequence model such as depicted in FIG. 3 may be used as a text classification model (sentiment analysis model or speech recognition model, for example) or a text prediction model.

Figure 4:
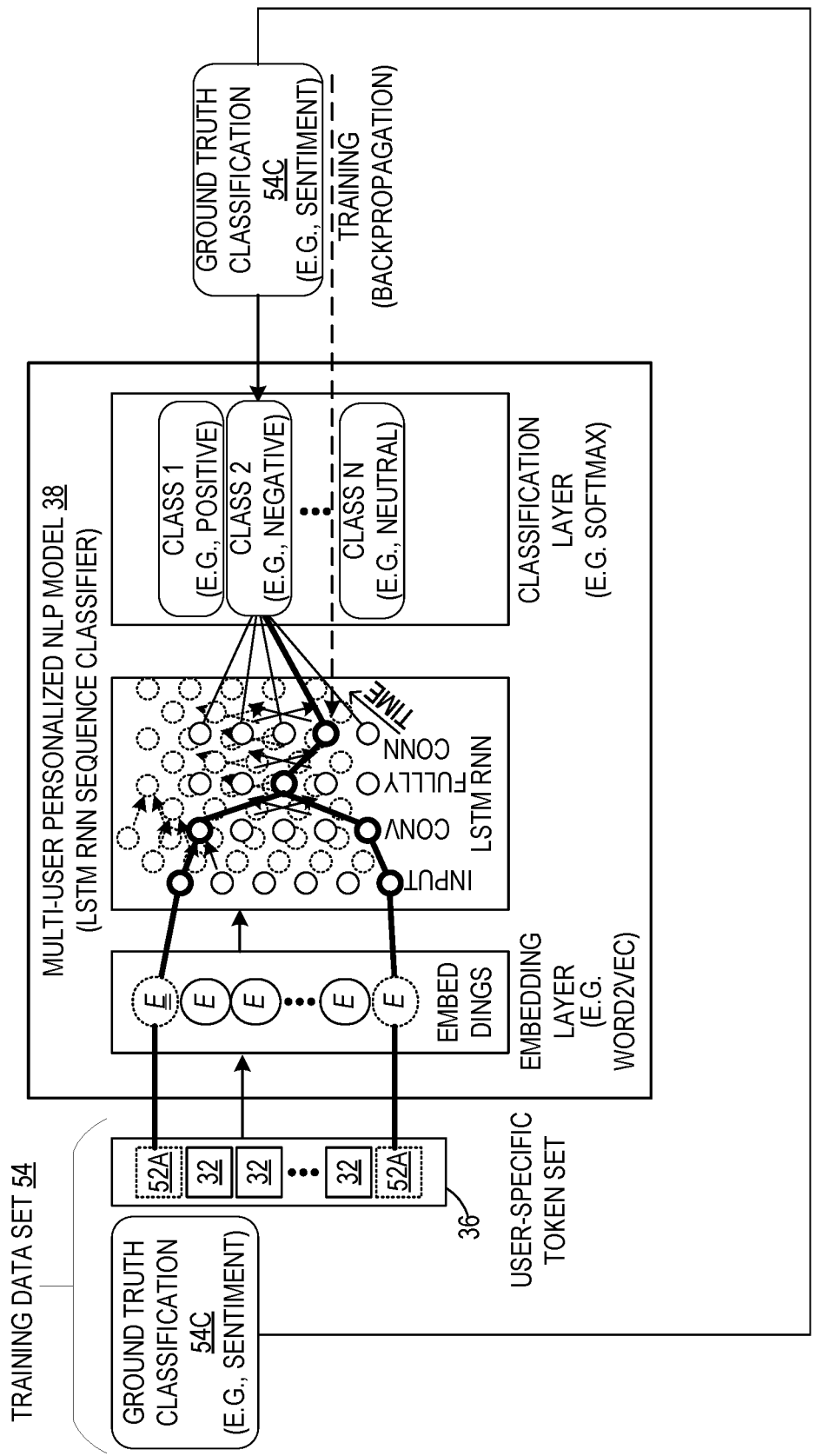
FIG. 4 is a schematic diagram illustrating details of training the multi-user personalized natural language processing model of the system of FIG. 1, configured as a Long Short Term Memory Recurrent Neural Network (LSTM RNN) sequence classifier.

Turning now to FIG. 4, a configuration of the personalized NLP model 38 is shown in which the model is a Long Short Term Memory (LSTM) recurrent neural network (RNN) sequence classifier. In this example, the LSTM RNN is used instead of a transformer. Some example applications of such a model are text classification, including sentiment analysis, and text prediction. Like the other examples, an input training data pairs are provided to train the system, each including a ground truth classification 54C, such as sentiment classification, and associated raw text data 54B, which has been tokenized by the tokenizer 30 and augmented with user-specific tokens 52A by the user specifier 34 into a user-specific token set 36. An embedding technique such as word2vec can be used to create embeddings in the embedding layer for each token in the user-specific token set 36 provided as input. The LSTM RNN has input, convolutional, and fully connected layers, the last of which is fully connected to each output node in the classification layer, which may be a SoftMax layer. To train the LSTM RNN, a suitable training algorithm such as backpropagation may be used to adjust the weights of the LSTM RNN for each ground truth classification and input user-specific token set 36 that are input to the model.

The personalized NLP model 38 may be trained on a centralized personalized NLP computing device 12. Alternatively, a federated learning approach may be used, in which the personalized NLP model 38 is initially trained on a client computing device 42, which then shares the gradients or model updates with the centralized personalized NLP computing device 12, which then aggregates the gradients from different users and sends back an updated model back to the client computing device 42 for further training.

Figure 5:
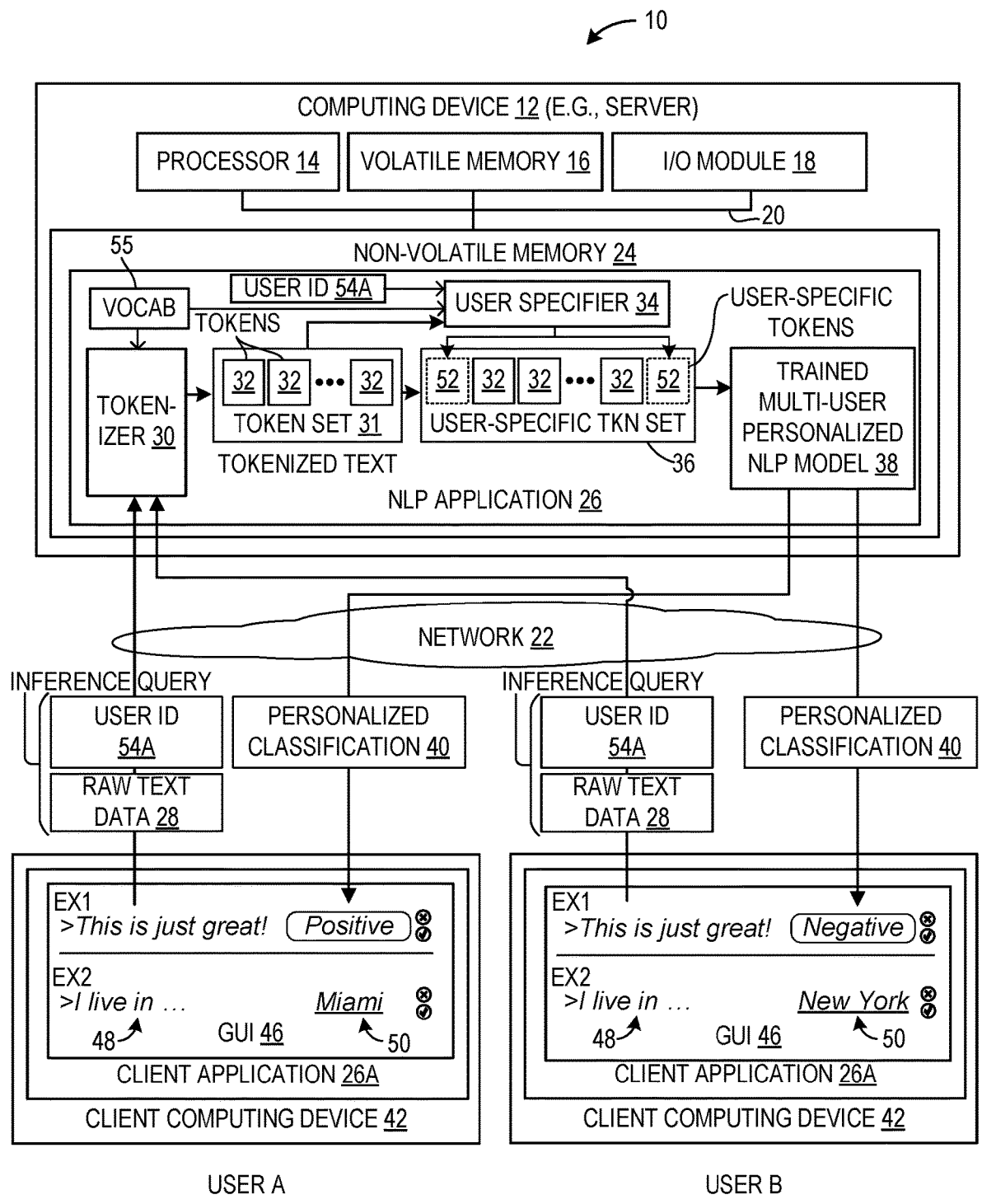
FIG. 5 is a schematic diagram illustrating the system of FIG. 1, at inference time.

Once the personalized NLP model 38 is trained, the trained personalized model may be made available for inference computations, as shown in FIG. 5. In the illustrated example, two users, User A and User B, are shown in interacting with the personalized NLP model from their respective client computing devices 42. The client computing devices 42 each execute an application client 26A configured to send inference-time user input 48 in the form of raw text data 28 to the computing device 12, and subsequently receive personalized classifications 40 from the computing device 12 as output. The application client 26A may include a graphical user interface 46, and configured to display graphical output 50 based on the personalized classifications 40 outputted from the personalized NLP model 38 and received at the client program 26A.

In a first depicted example relating to sentiment analysis, User A types "This is just great!" which is classified by the trained personalized NLP model 38, and a personalized classification 40 of "Positive" sentiment is returned and displayed on the GUI 46. In contrast, User B types "This is just great!" which is converted to tokenized text augmented with the user-specific tokens 52, and then classified by the trained NLP model 38. A personalized classification 40 of "Negative" is returned and displayed on the GUI 46 of the client computing device of User B. A feedback mechanism is provided for the User A and User B to accept or reject these classification. User responses can be used to feedback train personalized NLP model 38. It will be appreciated that in the first depicted example, the trained personalized NLP model 38 can be a transformer sequence classifier as shown in FIG. 2 or an LSTM RNN sequence classifier as shown in FIG. 4. Alternatively, another type of classifier may be used. Further, while the output of each personal classification 40 is shown being sent to the computing device of each user, in many applications batches of data for many users will be classified and the personal classifications for each user will be stored in a repository together.

In a second depicted example relating to next word prediction, User A types "I live in . . . " which is classified by trained personalized NLP model 38, and a personal classification 40 of "Miami" is returned and displayed on the GUI 46 of the computing device 42 of User A. In contrast, User B types "I live in . . . " which is sent to NLP application 26 with a user identifier 54A for User A. User specifier 34 then inserts the user-specific token 52 into the tokens 32 to create the user-specific token set 36. The user-specific token set 36 is classified by trained personalized NLP model 38, and a personal classification 40 of "New York" is returned and displayed on the GUI 46 of the computing device 42 of User A. It will be appreciated that in the second depicted example, the trained personalized NLP model 38 can be a transformer sequence-to-sequence model as shown in FIG. 3. Alternatively, another type of sequence-to-sequence or sequence-to-next-word-model may be used. These results are able to be obtained because in the training data set 54, sentences from each user were provided that associated similar phrases with Miami and New York, respectively, and the personalized NLP model 38 was trained to pay sufficient attention to the user-specific tokens associated with those user-specific token sets to make a proper prediction of the next word in this example.

As shown in FIG. 5, at inference time the tokenizer 30 receives a plurality of sets of raw text data 28 as input, and tokenizes the plurality of sets of raw text data 28 to generate a plurality of sets of tokenized text data 31 for the plurality of users, examples of whom are illustrated as User A and B. Each set of tokenized text data 31 includes a sequence of individual tokens 32 corresponding to the raw text 28, similar to at training time. The tokens 32 identify or represent distinct words or portions of words within the raw text 28. The tokens may also include special tokens that mark the beginning and ending of sentences within the raw text data 28 at both inference time and training time, as illustrated in FIGS. 6A-6D. The user specifier 34 receives the plurality of sets of tokenized text data 31 as input at inference time and appends (or inserts) predetermined user-specific tokens 52 to the plurality of sets of tokenized text data 32 from the plurality of users, respectively, to generate a user-specific token set 36. Each predetermined user-specific token 52 corresponds to one of the plurality of users. Typically, the user specifier reads the user identifier 54A received from each user of each client computing device 42 along with raw text data 28 in each respective inference query, and determines an appropriate predetermined user-specific token 52 to insert into the user-specific token set 36. The user-specific tokens 52 are typically formed from elements of the vocabulary 55 of the tokenizer 30, as described in more detail below.

Continuing with inference time, the personalized NLP model 38 receives the user-specific token set 36 as input, processes the plurality of sets of tokenized text data 36 using the NLP model 38 in accordance with the appended predetermined user-specific tokens 52 to predict (i.e., make an inference of) a personalized classification for each of the plurality of sets of tokenized text data 36 from each of the plurality of users. The personalized NLP model 38 outputs the personalized classifications 40 of the plurality of sets of tokenized text data 36 for each of the plurality of users, for example to each of the client computing devices 42 that originated the inference queries to the computing device 12.

In the example of FIG. 5, the personalized NLP model 38 may be configured as a transformer classification model. The personalized NLP model 38 may be a personalized sentiment analysis model (i.e., a transformer classification model configured to perform sentiment analysis with personalization), and the personalized classifications 40 may be personalized sentiment analysis classifications for each of the plurality of users. In this configuration, the personalized sentiment analysis model may output one of a plurality of sentiment labels, which may include at least a positive sentiment, a neutral sentiment, and a negative sentiment, in response to each of the plurality of sets of tokenized text data for each of the plurality of users. Alternatively, the personalized NLP model 38 may be a transformer sequence-to-sequence model configured to predict a next word or sequence of words given an input sequence of words, a RNN LSTM sequence classifier, etc., as described above. In one specific application, the personalized NLP model 38 may be a text prediction model, and the personalized classifications 40 may be personalized text predictions for each of the plurality of users. In another specific application, the personalized NLP model 38 may be a speech recognition model, and the personalized classifications 40 may be personalized speech recognition for each of the plurality of users. One application of the latter is to provide personalized recognition of a user's unique pronunciation of certain words or phrases, such as a family member's names, place names, etc.

Figure 6A:
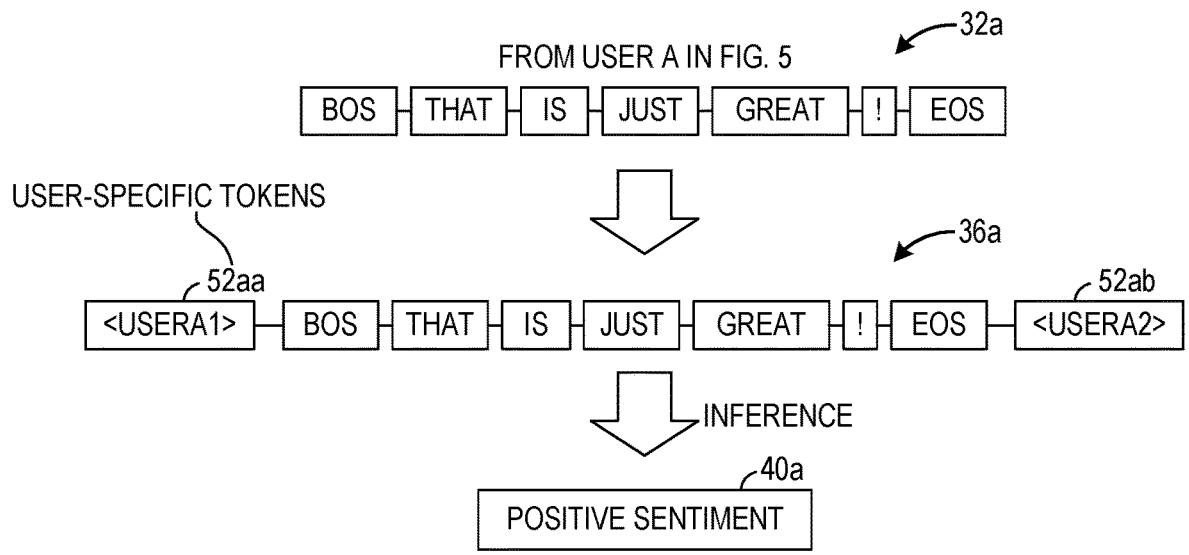
FIGS. 6A-6D are schematic diagrams respectively illustrating the processing by the system FIG. 1 of tokenized text data containing identical raw text data from two different users, resulting in different sentiment classifications.
Figure 6B:
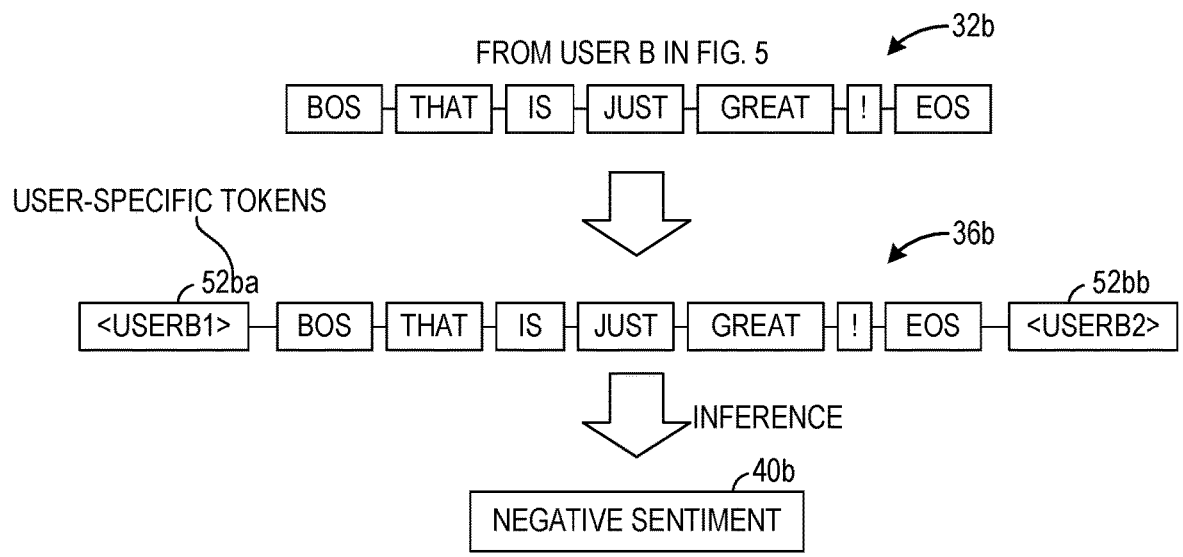

Referring to FIG. 6A, an exemplary illustration is provided of the processing of a set of tokenized text data 31 based on the first example user input 48 of FIG. 5. Predetermined user-specific tokens 52 are appended to the tokenized text data 31 from each of plurality of users, with User A input represented in FIG. 6A and User B input represented in FIG. 6B. As shown in FIG. 6A, a first predetermined user-specific token 52aa of the first user is appended to the first tokenized text data 32a to generate a first user-specific token set 36a, and as shown in FIG. 6B a second predetermined user-specific token 52ba of the second user is appended to the second tokenized text data 32b to generate a second user-specific token set 36b. In some embodiments, a first predetermined user-specific end token 52ab can also be appended to the end of the first tokenized text data 32a, and a second predetermined user-specific end token 52bb can also be appended to the end of the second tokenized text data 32b. In this example, first predetermined user-specific tokens 52aa, 52ab are appended to the beginning and the end of the set of first tokenized text data 32a of the first user, respectively, and second predetermined user-specific tokens

52ba, 52bb are appended to the beginning and the end of the set of second tokenized text data 32b of the second user, respectively. Typically, the user-specific tokens are appended prior to a Beginning Of Sentence (BOS) token and after an End Of Sentence (EOS) token, although they could be alternatively appended after the BOS token and prior to the EOS token, if desired.

The personalized NLP model 38 receives the first user-specific token set 36a and the second user-specific token set 36b as input, processes the first user-specific token set 36a and the second user-specific token set 36b in accordance with the appended first predetermined user-specific token 52aa and the second predetermined user-specific token 52ba, respectively, to predict (i.e., make an inference of) a first personalized classification 40a and a second personalized classification 40b for the first user-specific token set 36a and the second user-specific token set 36b from the first user and the second user, respectively. The personalized NLP model 38 then outputs the first personalized classification 40a and the second personalized classification 40b for the User A and User B, respectively. As shown in the example of FIGS. 6A and 6B, the same statement (E.g., "That is just great!") may be assigned different sentiment classifications (E.g., Positive, Negative) depending on which user utters the statement.

Figure 6C:
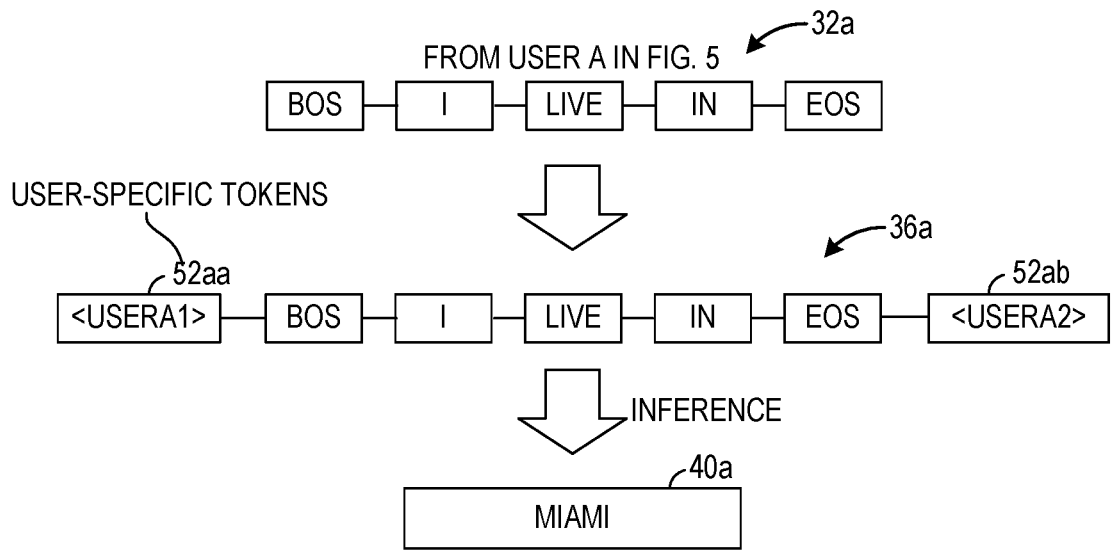
Figure 6D:
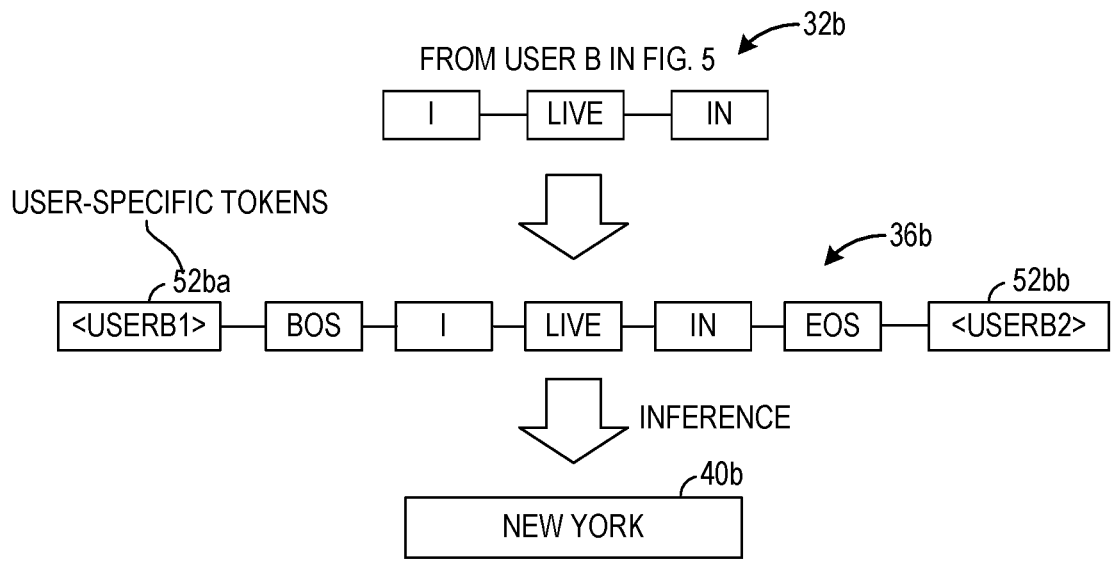

FIGS. 6C and 6D illustrate user input of Example 2 of FIG. 5, according to which raw text data 28 of the form "I live in" is inputted by each of User A and User B, tokenized, and appended with user-specific tokens 52aa, 52ab, 52ba, and 52bb, in a similar manner as described above. In this example, the personalized NLP model 38 is configured as a transformer sequence-to-sequence model of the form shown in FIG. 3, or of another suitable form, and outputs "Miami" for User A and "New York" for User B, based on the training it has received during the training phase using data collected from each user. In this manner, the personalized NLP model 38 can perform next word classification for the same raw text data that results in a different next word being predicted for each user.

The user-specific token 52 may be a user identification name or username that is unique to each user, at least within the set of users for which the personalized NLP model 38 is personalized. For example, the unique user-specific token 52 may comprise a random or pseudorandom sequence of digits or alphanumeric characters. The user-specific token 52 may be consecutive numbers. For example, the first user may be assigned a user-specific token of '1047681', the second user may be assigned a user-specific token of "1047682', and the third user may be assigned a user-specific token of "1047683'. Alternatively, the user-specific token may be a sequence of tokens. For example, the user-specific token may be a unique (at least within the set of users) random or pseudorandom sequence of tokens with non-alphanumeric characters. In one embodiment, the user's identifying sequence of tokens may be randomly generated by uniformly sampling from the vocabulary of the tokenizer 30 for a given length L, which is then ablated. In other words, a series of unique (within the user set) random or pseudorandom sequences of all available tokens in a tokenizer vocabulary are generated. In accordance with this step, a set of diverse and locally unique user identifiers is created, allowing the personalized NLP model 38 to distinguish different users efficiently. It is possible to generate globally unique identifiers (GUIDs) as the user-specific tokens.

The effectiveness of the system of the present disclosure has been demonstrated by experimenting with three sentiment analysis datasets, using representations from BERT (Bidirectional Encoder Representations from Transformers) and RoBERTa (Robustly optimized BERT). FIG. 7 shows a summary of the datasets used in these experiments. The Internet Movie Database (IMDb) dataset and the YELP datasets were used for comparison with the two-phase personalization method and for ablation studies. Each user's data was split into a training set, a testing set, and a validation set, with 0:8, 0:1, 0:1 ratios. For comparison purposes, a subset was used of the available users (those with fewer than 50 samples) in support of few-shot learning, for reporting test accuracy. As such, test accuracy was reported on a test set of 229 users for the IMDb task, and on a set of 1213 users for the YELP task. The RoBERTa-base model was used for this set of experiments.

In addition to IMDb and YELP, the system of the present disclosure was also used on the Sentiment140 (Sent140) dataset, which is a set of posts collected from the social media platform TWITTER and labeled positive or negative based on the emojis in each Tweet. For this dataset, unlike with IMDb and YELP, test accuracies were reported on all users. The Sentiment140 dataset was preprocessed and partitioned, and then a second version of this dataset was created and marked as "skewed". For this skewed data, the users were selected such that their sentiments were mostly skewed. In other words, only users with 80% or more positive or negative social media posts were included, so that the data was more heterogeneously distributed. BERT-base-uncased was used for evaluations on the Sentiment140 dataset.

Before the performance of the system of the present disclosure was investigated, the baseline performance was first established. The first baseline was the conventional fine tuning of the pre-trained transformer model on the full dataset without any user-level personalization. The second baseline was the two-phase personalization method, in which a per-user embedding was learned through few-shot learning. These personal vectors were prepended to the users' data to create personal responses. In other words, prefix-tuning was performed on a user-level. Unlike the system of the present disclosure, the two-phase personalization method consists of a first phase of general model fine tuning, where all of the available data is used to fine tune the pre-trained model for a given task, and the second phase where each user's data is used to train their own personal vector. This means that the two-phase personalization method, unlike the present disclosure, requires adding separate, per-user trainable parameters to the model, and storing the trained value of those parameters for each user.

Referring to FIG. 8, a table is shown comparing the system of the present disclosure (UserIdentifier) to a conventional two-phase personalization method (UserAdapter) and other baselines. For the Num. (consecutive numbers) and Def. (default username) scenarios, the length of the user identifier sequences depends solely on the tokenization process. For the case of Rand. All (randomly sampled from all vocabulary tokens), however, it is shown that the sequence length of 10 tokens provides excellent performance through the ablation study. Therefore the results are reported for this length. Since the default usernames for IMDb and YELP datasets are not provided, the corresponding results are not reported in FIG. 8.

As shown in FIG. 8, the system of the present disclosure with randomly generated identifiers outperformed all baselines in all tasks, which was presumably due to the collaborative learning and personalization which happen simultaneously, unlike the conventional two-phase personalization method, where personalization is performed separately for each user. The performance of trainable user embeddings in the two-phase personalization method appears inferior to that of the system of the present disclosure, which could be attributed to the parameter tying used in the system of the present disclosure.

This parameter tying couples the learning problems for both domains (user identifier and text) and allows learning from the full data. For the Sentiment140 dataset, it is shown that increasing the heterogeneity or skew in the dataset boosts the benefits brought about by the system of the present disclosure. This shows that the system of the present disclosure performs more effectively in setups where personalized classifications are performed.

Referring to FIG. 9, a table is shown of an ablation study into the sequence length (Seq. Len.) and the type of the user identifier sequence for IMDb and Yelp datasets. The most evident trend is that performance significantly degrades in both datasets when the length of the user identifier sequence exceeds 20 tokens, holding for all identifier types. This is because the length of the input text itself is essentially decreased when increasing the length of the identifier. This decreases the useful information which could be used to infer sentiment, and in turn it has an adverse effect on accuracy. Therefore, lengths of the predetermined user-specific tokens preferably do not exceed a predetermined number of tokens, which may be 10 to 50, for example.

The predetermined user-specific tokens preferably comprise random sequences of all available tokens in a tokenizer vocabulary. FIG. 9 also shows that randomly sampling from the entire vocabulary of the tokenizer (Rand. All) outperforms randomly sampling only from digits (Rand. Dig.) or from the non-alphanumeric tokens (Rand. Non.). This may be attributed to the different sizes of the sampling spaces for these three types, and the probability of overlap in user identifier from user to user. For the random digits (Rand. Dig.) the sample space size for each token position was 10, the number of possible digits. The non-alphanumeric tokens were limited to 400, and for the token type all (Rand. All), the possible sample space is 47400. This means that the probability of having token overlaps in user identifiers is much smaller in the scheme of randomly sampling from the entire vocabulary of the tokenizer (Rand. All), than it is for the schemes of randomly sampling only from digits (Rand. Dig.) or from the non-alphanumeric tokens (Rand. Non.).

Figure 10:
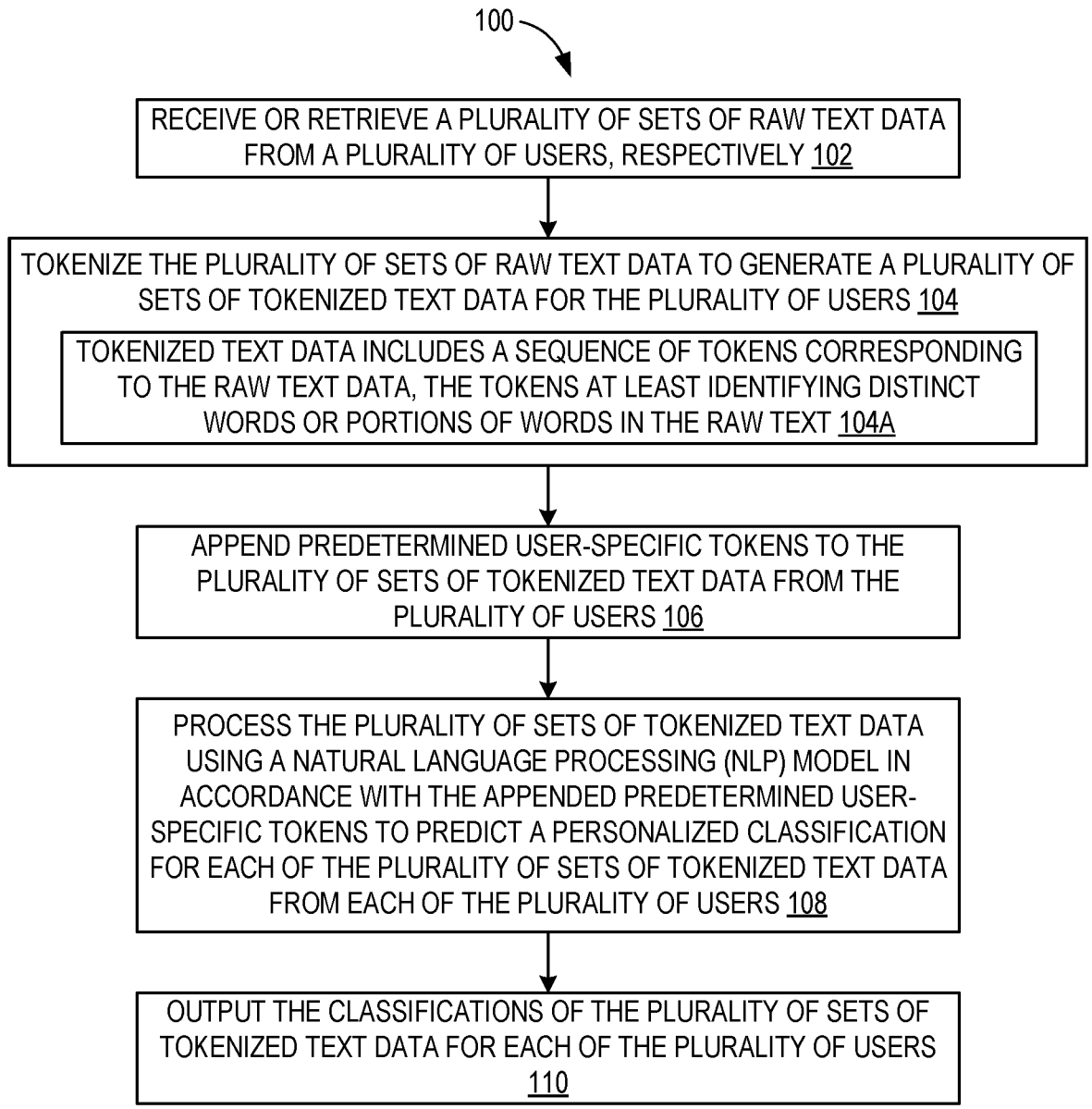
FIG. 10 is a flowchart illustrating a method for outputting personalized classifications of a plurality of sets of tokenized text data for each of a plurality of users according to an example embodiment of the subject disclosure.

Referring to FIG. 10, a method 100 is described for outputting personalized classifications of a plurality of sets of tokenized text data for each of a plurality of users. The following description of the method 100 is provided with reference to the software and hardware components described above and shown in FIGS. 1-5. It will be appreciated that the method 100 also may be performed in other contexts using other suitable hardware and software components.

At step 102, method 100 includes receiving or retrieve a plurality of sets of raw text data from a plurality of users, respectively. At step 104, the method includes tokenizing the plurality of sets of raw text data to generate a plurality of sets of tokenized text data for the plurality of users, respectively. As shown at 104A, the tokenized text data includes a sequence of tokens corresponding to the raw text data, and the tokens at least identify distinct words or portions of words in the raw text. At step 106, the method includes appending predetermined user-specific tokens to the plurality of sets of tokenized text data from the plurality of users, respectively. Each predetermined user-specific token corresponds to one of the plurality of users. At step 108, the method includes processing the plurality of sets of tokenized text data using an NLP model in accordance with the appended predetermined user-specific tokens to predict a personalized classification for each of the plurality of sets of tokenized text data from each of the plurality of users. At step 110, the method includes outputting the personalized classifications of the plurality of sets of tokenized text data for each of the plurality of users.

The above-described systems and methods may be used to implement a single shared NLP model for all users, producing personalized responses by adding fixed, non-trainable user identifiers to the input data. Accordingly, no additional model parameters, specialized training algorithms, or extra rounds of few-shot fine-tuning of the NLP model are necessary for training, thereby avoiding the computational complexity of training separate models for each different user. The added context provided by the non-trainable, unique user identifiers helps the shared NLP model better distinguish different users and produce personalized responses. Additionally, the above-described systems and methods can outperform conventional systems and methods at least on sentiment analysis datasets in personalized sentiment analysis applications.

Figure 11:
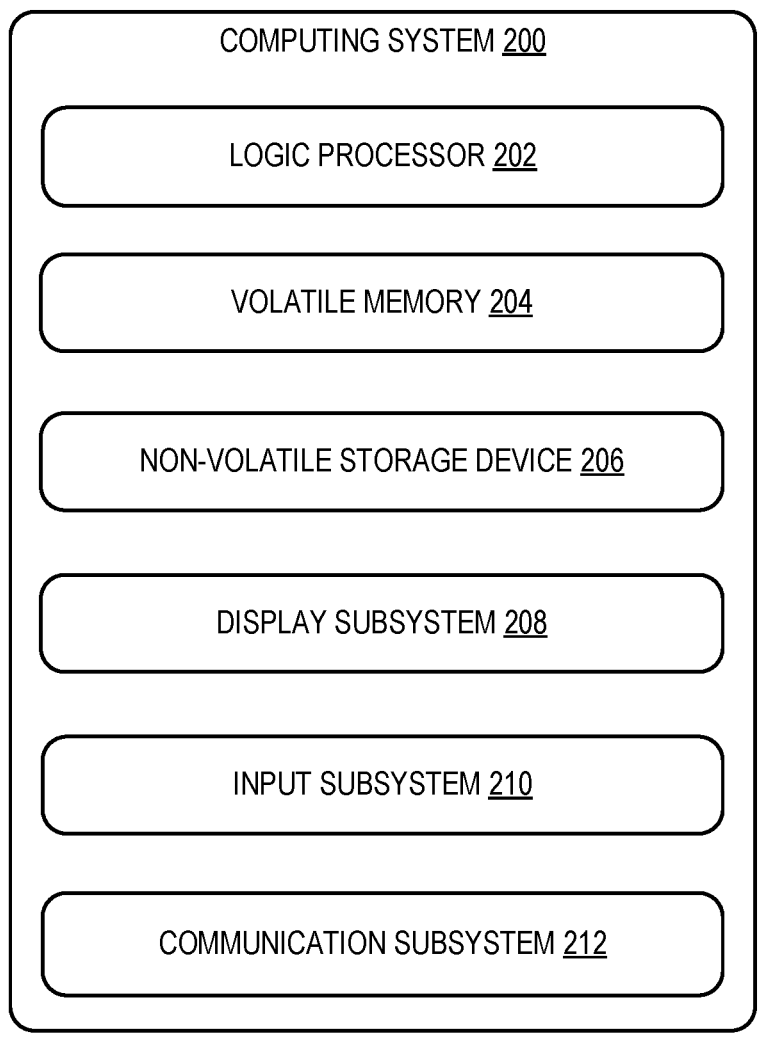
FIG. 11 is a schematic diagram illustrating an exemplary computing system that may be used to implement the personalized natural language processing system of FIG. 1.

FIG. 11 schematically shows a non-limiting embodiment of a computing system 200 that can enact one or more of the processes described above. Computing system 200 is shown in simplified form. Computing system 200 can embody the computing device 12 or client computing device 42 described above. Computing system 200 can take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 can optionally include a display subsystem 208, input subsystem 210, communication subsystem 212, and/or other components not shown in earlier Figures.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor can include one or more physical processors (hardware) configured to execute software instructions. Additionally or alternatively, the logic processor can include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 can include physical devices that are removable and/or built in. Non-volatile storage device 206 can include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 can include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 can include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), SOC, and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" can encompass individual or groups of executable files, data files, libraries, drivers, scripts, database records, etc.

When included display subsystem 208 may be used to present a visual representation of data held by non-volatile storage device 206. The visual representation can take the form of a graphical user interface (GUI). As the herein described methods and processes change the data held by the non-volatile storage device, and thus transform the state of the non-volatile storage device, the state of display subsystem 208 can likewise be transformed to visually represent changes in the underlying data. Display subsystem 208 can include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 can comprise or interface with one or more user-input devices such as a keyboard, mouse, touch screen, or game controller. In some embodiments, the input subsystem can comprise or interface with selected natural user input (NUI) componentry. Such componentry may be integrated or peripheral, and the transduction and/or processing of input actions may be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 can include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem can allow computing system 200 to send and/or receive messages to and/or from other devices via a network such as the Internet.

The following paragraphs provide additional support for the claims of the subject application. One aspect provides a personalized natural language processing system comprising: at least one processor, communicatively coupled to non-volatile memory storing a natural language processing (NLP) model personalized for use by multiple users and instructions that, when executed by the processor, cause the processor to: receive or retrieve a plurality of sets of raw text data from a plurality of users, respectively; tokenize the plurality of sets of raw text data to generate a plurality of sets of tokenized text data for the plurality of users, respectively, the tokenized text data including a sequence of tokens corresponding to the raw text data, the tokens at least identifying distinct words or portions of words in the raw text; append predetermined user-specific tokens to the plurality of sets of tokenized text data from the plurality of users, respectively, each predetermined user-specific token corresponding to one of the plurality of users; process the plurality of sets of tokenized text data using the NLP model in accordance with the appended predetermined user-specific tokens to predict a personalized classification for each of the plurality of sets of tokenized text data from plurality of users; and output the personalized classifications of the plurality of sets of tokenized text data for each of the plurality of users. In this aspect, additionally or alternatively, the NLP model is a text classification model; and the personalized classifications are personalized text classifications for each of the plurality of users. In this aspect, additionally or alternatively, the NLP model is a text prediction model; and the personalized classifications are personalized text predictions for each of the plurality of users. In this aspect, additionally or alternatively, the predetermined user-specific tokens include at least one of consecutive numbers, usernames, random sequences of digits, random sequences of tokens with non-alphanumeric characters, or random sequences of all available tokens in a tokenizer vocabulary. In this aspect, additionally or alternatively, the processor is configured to train the NLP model using the plurality of sets of tokenized text data with the appended predetermined user-specific tokens. In this aspect, additionally or alternatively, the training of the NLP model includes minimizing cross-entropy loss for classification. In this aspect, additionally or alternatively, the predetermined user-specific tokens are appended to the beginning and the end of each set of tokenized text data. In this aspect, additionally or alternatively, lengths of the predetermined user-specific tokens do not exceed a predetermined number of tokens. In this aspect, additionally or alternatively, the NLP model is a transformer sequence classifier, transformer sequence-to-sequence model, or long short-term memory (LSTM) recurrent neural network (RNN) classifier. In this aspect, additionally or alternatively, the NLP model is a transformer sequence classifier, and user embedding parameters of the predetermined user-specific tokens are tied to embedding parameters of the transformer sequence classifier.

Another aspect provides a personalized natural language processing method, comprising: receiving or retrieve a plurality of sets of raw text data from a plurality of users, respectively; tokenizing the plurality of sets of raw text data to generate a plurality of sets of tokenized text data for the plurality of users, respectively, the tokenized text data including a sequence of tokens corresponding to the raw text data, the tokens at least identifying distinct words or portions of words in the raw text; appending predetermined user-specific tokens to the plurality of sets of tokenized text data from the plurality of users, respectively, each predetermined user-specific token corresponding to one of the plurality of users; processing the plurality of sets of tokenized text data using a natural language processing (NLP) model in accordance with the appended predetermined user-specific tokens to predict a personalized classification for each of the plurality of sets of tokenized text data from each of the plurality of users; and outputting the personalized classifications of the plurality of sets of tokenized text data for each of the plurality of users. In this aspect, additionally or alternatively, the NLP model is a text classification model; and the personalized classifications are personalized text classifications for each of the plurality of users. In this aspect, additionally or alternatively, the NLP model is a text prediction model; and the personalized classifications are personalized text predictions for each of the plurality of users. In this aspect, additionally or alternatively, the predetermined user-specific tokens comprise one of consecutive numbers, usernames, random sequences of digits, random sequences of tokens with non-alphanumeric characters, or random sequences of all available tokens in a tokenizer vocabulary. In this aspect, additionally or alternatively, the method further comprises training the NLP model using the plurality of sets of tokenized text data with the appended predetermined user-specific tokens. In this aspect, additionally or alternatively, the training of the NLP model includes minimizing cross-entropy loss for classification. In this aspect, additionally or alternatively, the predetermined user-specific tokens are appended to a beginning and an end of each set of tokenized text data. In this aspect, additionally or alternatively, the NLP model is a transformer sequence classifier, transformer sequence-to-sequence model, or long short-term memory (LSTM) recurrent neural network (RNN) classifier. In this aspect, additionally or alternatively, the NLP model is a transformer sequence classifier, and user embedding parameters of the predetermined user-specific tokens are tied to embedding parameters of the transformer sequence classifier.

Another aspect provides a personalized natural language processing system comprising at least one processor, communicatively coupled to non-volatile memory storing a sentiment analysis model and instructions that, when executed by the processor, cause the processor to: receive or retrieve a plurality of sets of utterances from a plurality of users, respectively; tokenize the plurality of sets of utterances to generate a plurality of sets of tokenized text data for the plurality of users, respectively, the tokenized text data including a sequence of tokens corresponding to the raw text data, the tokens at least identifying distinct words or portions of words in the raw text; append predetermined user-specific tokens to the plurality of sets of tokenized text data from the plurality of users, respectively, each predetermined user-specific token corresponding to one of the plurality of users; process the plurality of sets of tokenized text data using the sentiment analysis model in accordance with the appended predetermined user-specific tokens to predict a personalized classification for each of the plurality of sets of tokenized text data from each of the plurality of users; and output the personalized classifications of the plurality of sets of tokenized text data for each of the plurality of users, the personalized classifications including a plurality of sentiment labels including at least a positive sentiment, a neutral sentiment, and a negative sentiment.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

Further, it will be appreciated that the terms "includes," "including," "has," "contains," variants thereof, and other similar words used in either the detailed description or the claims are intended to be inclusive in a manner similar to the term "comprising" as an open transition word without precluding any additional or other elements.

It will be appreciated that "and/or" as used herein refers to the logical disjunction operation, and thus A and/or B has the following truth table.

| A | B | A and/or B |
|---|---|------------|
| T | T | T |
| T | F | T |
| F | T | T |
| F | F | F |

The invention claimed is:

1. A personalized natural language processing system comprising:
   at least one processor, communicatively coupled to non-volatile memory storing a natural language processing (NLP) model personalized for use by multiple users and instructions that, when executed by the processor, cause the processor to:

receive or retrieve a plurality of sets of raw text data from a plurality of users, respectively;

tokenize the plurality of sets of raw text data to generate a plurality of sets of tokenized text data for the plurality of users, respectively, each set of tokenized text data including a sequence of tokens corresponding to the raw text data, the tokens at least identifying distinct words or portions of words in the raw text data;

append predetermined user-specific tokens to the plurality of sets of tokenized text data from the plurality of users, respectively, to generate a plurality of user-specific token sets, each predetermined user-specific token corresponding to one user of the plurality of users;

process the plurality of user-specific token sets using the NLP model in accordance with the appended predetermined user-specific tokens to predict a personalized classification for each of the plurality of user-specific token sets; and output the personalized classifications of the plurality of user-specific token sets, wherein the NLP model is trained using a training data set comprising multiple tuples of training data, each tuple including user identifier data that identifies a particular user, raw text data from the particular user, and ground truth classification data, the trained NLP model being configured to perform personalized text classification and/or text prediction tasks for each user of the multiple users, and during processing of the plurality of user-specific token sets, embeddings are produced for each token in each set of the plurality of user-specific token sets, and attention weights are computed between each token in each user-specific token set using the embeddings for each token.

2. The personalized natural language processing system of claim 1, wherein the NLP model is a text classification model; and the personalized classifications are personalized text classifications for each of the plurality of users.

3. The personalized natural language processing system of claim 1, wherein the NLP model is a text prediction model; and the personalized classifications are personalized text predictions for each of the plurality of users.

4. The personalized natural language processing system of claim 1, wherein the predetermined user-specific tokens include at least one of consecutive numbers, usernames, random sequences of digits, random sequences of tokens with non-alphanumeric characters, or random sequences of all available tokens in a tokenizer vocabulary.

5. The personalized natural language processing system of claim 1, wherein the training of the NLP model includes minimizing cross-entropy loss for classification.

6. The personalized natural language processing system of claim 1, wherein the predetermined user-specific tokens are appended to the beginning and the end of each set of tokenized text data.

7. The personalized natural language processing system of claim 1, wherein lengths of the predetermined user-specific tokens do not exceed a predetermined number of tokens.

8. The personalized natural language processing system of claim 1, wherein the NLP model is a transformer sequence classifier, transformer sequence-to-sequence model, or long short-term memory (LSTM) recurrent neural network (RNN) classifier.

9. The personalized natural language processing system of claim 1, wherein the NLP model is a transformer sequence classifier, and user embedding parameters of the predetermined user-specific tokens are tied to embedding parameters of the transformer sequence classifier.

10. A personalized natural language processing method, comprising:

receiving or retrieve a plurality of sets of raw text data from a plurality of users, respectively;

tokenizing the plurality of sets of raw text data to generate a plurality of sets of tokenized text data for the plurality of users, respectively, each set of tokenized text data including a sequence of tokens corresponding to the raw text data, the tokens at least identifying distinct words or portions of words in the raw text data;

appending predetermined user-specific tokens to the plurality of sets of tokenized text data from the plurality of users, respectively, to generate a plurality of user-specific token sets, each predetermined user-specific token corresponding to one user of the plurality of users;

processing the plurality of user-specific token sets sing a natural language processing (NLP) model in accordance with the appended predetermined user-specific tokens to predict a personalized classification for each of the plurality of user-specific token sets; and outputting the personalized classifications of the plurality of user-specific token sets, wherein the NLP model is trained using a training data set comprising multiple tuples of training data, each tuple including user identifier data that identifies a particular user, raw text data from the particular user, and ground truth classification data, the trained NLP model being configured to perform personalized text classification and/or text prediction tasks for each user of the multiple users, and during processing of the plurality of user-specific token sets, embeddings are produced for each token in each set of the plurality of user-specific token sets, and attention weights are computed between each token in each user-specific token set using the embeddings for each token.

11. The personalized natural language processing method of claim 10, wherein the NLP model is a text classification model; and the personalized classifications are personalized text classifications for each of the plurality of users.

12. The personalized natural language processing method of claim 10, wherein the NLP model is a text prediction model; and the personalized classifications are personalized text predictions for each of the plurality of users.

13. The personalized natural language processing method of claim 10, wherein the predetermined user-specific tokens comprise one of consecutive numbers, usernames, random sequences of digits, random sequences of tokens with non-alphanumeric characters, or random sequences of all available tokens in a tokenizer vocabulary.

14. The personalized natural language processing method of claim 10, wherein the training of the NLP model includes minimizing cross-entropy loss for classification.

15. The personalized natural language processing method of claim 10, wherein the predetermined user-specific tokens are appended to a beginning and an end of each set of tokenized text data.

16. The personalized natural language processing method of claim 10, wherein the NLP model is a transformer sequence classifier, transformer sequence-to-sequence model, or long short-term memory (LSTM) recurrent neural network (RNN) classifier.

17. The personalized natural language processing method of claim 10, wherein the NLP model is a transformer sequence classifier, and user embedding parameters of the predetermined user-specific tokens are tied to embedding parameters of the transformer sequence classifier.

18. A personalized natural language processing system comprising:
   at least one processor, communicatively coupled to non-volatile memory storing a sentiment analysis model and instructions that, when executed by the processor, cause the processor to:
      receive or retrieve a plurality of sets of utterances from a plurality of users, respectively;
      tokenize the plurality of sets of utterances to generate a plurality of sets of tokenized text data for the plurality of users, respectively, each set of tokenized text data including a sequence of tokens corresponding to the raw text data, the tokens at least identifying distinct words or portions of words in the raw text data;
      append predetermined user-specific tokens to the plurality of sets of tokenized text data from the plurality of users, respectively, to generate a plurality of user-specific token sets, each predetermined user-specific token corresponding to one user of the plurality of users;
      process the plurality of user-specific token sets using the sentiment analysis model in accordance with the appended predetermined user-specific tokens to predict a personalized classification for each of the plurality of user-specific token sets; and
      output the personalized classifications of the plurality of user-specific token sets, wherein the sentiment analysis model is trained using a training data set comprising multiple tuples of training data, each tuple including user identifier data that identifies a particular user, raw text data from the particular user, and ground truth classification data, the trained NLP model being configured to perform personalized text classification and/or text prediction tasks for each user of the multiple users, during processing of the plurality of user-specific token sets, embeddings are produced for each token in each set of the plurality of user-specific token sets, and attention weights are computed between each token in each user-specific token set using the embeddings for each token, and the personalized classifications include a plurality of sentiment labels including at least a positive sentiment, a neutral sentiment, and a negative sentiment.

* * * * *